United States Patent [19]

Vinel et al.

[11] Patent Number: 5,488,607

[45] Date of Patent: Jan. 30, 1996

[54] ASYNCHRONOUS TIME-DIVISION MULTIPLEX COMMUNICATION MEDIUM VIRTUAL CIRCUIT THROUGHPUT MEASURING DEVICE

[75] Inventors: Paul Vinel, Velizy; Marc Dieudonne, Igny, both of France

[73] Assignee: Alcatel N.V., Amsterdam, Netherlands

[21] Appl. No.: 233,205

[22] Filed: Apr. 26, 1994

Related U.S. Application Data

[63] Continuation of Ser. No. 899,738, Jun. 17, 1992, abandoned.

[30] Foreign Application Priority Data

Jun. 18, 1991 [FR] France .................................... 91 07430

[51] Int. Cl.$^6$ ........................................................ H04J 1/16
[52] U.S. Cl. .................................................. 370/17; 370/60
[58] Field of Search .......................... 370/60, 60.1, 94.1, 370/13, 16, 17, 94.2

[56] References Cited

U.S. PATENT DOCUMENTS

| | | | |
|---|---|---|---|
| 4,896,316 | 1/1990 | Lespagnol et al. | 370/94.1 |
| 5,081,620 | 1/1992 | Girard et al. | 370/94.1 |
| 5,117,417 | 5/1992 | Danner | 370/84 |
| 5,119,364 | 6/1992 | Thiebaut et al. | 370/94.1 |
| 5,128,924 | 7/1992 | Le Bihan | 370/60 |
| 5,132,961 | 7/1992 | Thiebaut et al. | 370/94.1 |
| 5,138,607 | 8/1992 | Thiebaut et al. | 370/94.1 |
| 5,140,588 | 8/1992 | Danner | 370/94.1 |
| 5,260,932 | 11/1993 | Vinel | 370/13 |

FOREIGN PATENT DOCUMENTS 0383660 8/1990 European Pat. Off. .
0403996 12/1990 European Pat. Off. .

OTHER PUBLICATIONS

Jäpel et al: "LAN/ISDN Interconnect via Frame Relay"; IEEE Global Telecom Conf, Hollywood, Fla.: *Conference Record* pp. 1791–1797; 1 Dec. 1988.

*Primary Examiner*—Douglas W. Olms
*Assistant Examiner*—Chau T. Nguyen
*Attorney, Agent, or Firm*—Robbins, Berliner & Carson

[57] ABSTRACT

A device evaluates the throughput of virtual circuits conveying cells and using an asynchronous time-division multiplex transmission medium. It comprises a store in which each virtual circuit is assigned a context containing a set of data defining the conditions for evaluating the throughput of the virtual circuit and data obtained from previous such evaluations. A clock supplies a current time and a processor unit reads the context of the respective virtual circuit when each cell is received. This context contains a start time which was the current time observed and stored when a previous cell of the virtual circuit in question was received. The start time is subtracted from the current time and the time difference obtained in this way together with the number of cells observed between that for which the start time was recorded and the present cell provide a basis for evaluating the throughput. The device comprises a unit for scanning the contexts cyclically and, during this cyclic scanning, incrementing for each context the content of a scan cycle counter having an initial position. The device also comprises a unit for identifying virtual circuits guaranteeing a minimal throughput and a processor unit comparing for each identified virtual circuit the content of the scan cycle counter for the identified virtual circuit with a predetermined threshold value to produce a cut off call detection signal if the content of the counter reaches the predetermined threshold value.

14 Claims, 2 Drawing Sheets

5,488,607

ASYNCHRONOUS TIME-DIVISION MULTIPLEX COMMUNICATION MEDIUM VIRTUAL CIRCUIT THROUGHPUT MEASURING DEVICE

This is a continuation of application Ser. No. 07/899,738, filed Jun. 17, 1992 and now abandoned.

BACKGROUND OF THE INVENTION

1. Field of the Invention

The invention concerns asynchronous time-division multiplex communication medium virtual circuit throughput measuring devices.

2. Description of the Prior Art

An asynchronous time-division multiplex transmission medium conveys data messages in digital data structures called cells. Each cell comprises a header made up of five characters each of eight bits, for example, and a message body comprising a defined number of characters (48 characters, for example). These cells are transmitted continuously.

The header of each message cell identifies the destination to which the message body must be transmitted for use at the receiving end and in the form of two characters, for example. The other characters of the header contain service data. The same destination data is included in all the irregularly spaced cells constituting the same call.

The destination data thus identifies what might be called a "virtual circuit" allocated to the call and which occupies part of the transmission capacity of the transmission medium. More generally, the virtual circuit occupies part of the capacity of the transmission medium expressed as a particular throughput measured in cells per unit time, for example. This throughput fluctuates relative to a nominal throughput assigned to the virtual circuit because of characteristics of the message source and/or because of characteristics of transmission equipments the signals have previously passed through. It is therefore necessary to measure this fluctuating throughput.

The transmission medium supports at all times a plurality of virtual circuits whose cells are interleaved in an irregular manner in what is called by convention asynchronous time-division multiplexing. The nominal throughputs of the various virtual circuits are different. Each fluctuates and the sum of the fluctuating throughputs is limited by the maximum throughput of the transmission medium.

The number of virtual circuits that can be separately identified is very large, as high as 64K for example. Only a reduced number of virtual circuits are active at any time.

The transmission medium supplies the cells that it conveys to switching and transmission equipment at its downstream end. This equipment also receives cells from other transmission media. To avoid congestion of this equipment, it is necessary to check that no virtual circuit is deliberately (i.e. fraudulently) or inadvertently generating for long periods a throughput exceeding the nominal throughput assigned to it. If this occurs, corrective action is taken to prevent the transmission medium forwarding any cell regarded as exceeding the nominal throughput of the virtual circuit.

Commonly assigned U.S. Pat. No. 5,138,607 (which is hereby incorporated by reference) discloses a method of evaluating the throughput of virtual circuits for the purposes of measuring the throughput of virtual circuits and limiting this throughput to a maximum value is based on the use of a store in which each virtual circuit is assigned a location containing a set of data (called the "context") defining the throughput evaluation conditions for the virtual circuit and containing data produced by earlier application of this evaluation process. This method uses a clock adapted to provide a current time expressed in a unit associated with the virtual circuit. When each cell is received the context of the respective virtual circuit is read. This context contains a start time which is the current time as observed and recorded on receiving an earlier cell of the virtual circuit in question. This start time is subtracted from the current time and the difference obtained, together with the number of cells observed between that which caused the start time to be recorded and the present cell, provides the basis for evaluating the throughput: it is possible to deduce from this data either the number of cells in a given time interval, by waiting for the time difference to reach this time interval, or the time required to receive a given number of cells, by waiting until this number of cells is reached.

In either case, the data on which the throughput evaluation is based is a time difference determined from a current time, which is a numerical indication supplied by a clock, and a start time, which is a similar numerical indication supplied by the clock previously and then stored in the context. This time difference is established when a cell is received.

If the number of bits in the indication supplied by the clock is limited, which is particularly beneficial as this makes it possible to reduce the size of the context of each virtual circuit, it can happen that in the event of prolonged interruption of transmission of cells on a particular virtual circuit the clock for this virtual circuit completes one or more full cycles before another cell of this virtual circuit is received. The time difference then obtained is no longer indicative of the gap between the new cell and the earlier cell which caused the start time to be recorded. For this reason there is additional provision for cyclic scanning of the contexts during which, within each context, a scanning cycle counter which has an initial position is incremented. Additional means read this scanning cycle counter when a cell is received, note its position relative to its initial position and, if the noted relative position represents a given number of scanning cycles greater than 1, inhibits any corrective action taken against the cells received.

This solution is described in French patent application No 90 09 441 corresponding to commonly assigned U.S. application Ser. No. 07/732,531, now U.S. Pat. No. 5, which is hereby incorporated by reference.

When each cell is received the scan counter of the respective virtual circuit is reset to its initial position (to zero, for example).

This avoids unjustified elimination or marking of cells received after what might be termed a long silence, that is to say after one or more complete cycles of the cyclic scanning clock.

However, this device cannot detect abnormal absence of cells of a given virtual circuit. Absence of cells for a certain time indicates a break in communication if the virtual circuit is of the type guaranteeing a minimal throughput. This applies in the case of speech links, for example, where periods in which the parties are silent are encoded and cause cells having null value message bodies to be transmitted. These cells therefore maintain a certain throughput on the transmission medium. In this type of communication a long silence indicates a fault.

What is more, the prior art devices cannot distinguish between a transmission medium guaranteeing a minimal throughput and a transmission medium where absence of cells during a certain time period does not indicate a fault. It is therefore not possible to use the scan counter previously mentioned to count a period in which no cells are received.

An object of the present invention is to alleviate these drawbacks.

To be more precise, an object of the invention is to provide a device able to detect the abnormal absence of cells in an asynchronous time-division multiplex call guaranteeing a minimum throughput.

SUMMARY OF THE INVENTION

The invention consists in a device for evaluating the throughput of virtual circuits conveying cells and using an asynchronous time-division multiplex transmission medium, comprising a store in which each virtual circuit is assigned a context containing a set of data defining the conditions for evaluating the throughput of said virtual circuit and data obtained from previous such evaluations, a clock adapted to supply a current time and a processor unit whereby, when each cell is received, the context of the respective virtual circuit is read, said context containing a start time which was the current time observed and stored when a previous cell of the virtual circuit in question was received, said start time being subtracted from the current time and the time difference obtained in this way together with the number of cells observed between that for which the start time was recorded and the present cell providing the basis for evaluating the throughput, said device further comprising means for scanning said contexts cyclically and, during said cyclic scanning, incrementing for each context the content of a scan cycle counter having an initial position, means for identifying virtual circuits guaranteeing a minimal throughput and processor means comparing for each identified virtual circuit the content of said scan cycle counter for said identified virtual circuit with a predetermined threshold value to produce a cut off call detection signal if the content of said counter reaches said predetermined threshold value.

Said identification means and said threshold value are advantageously activated by context programming means cooperating with means for reading call type data conveyed on said transmission medium at the start of setting up of said call by a cell sender of a virtual circuit guaranteeing a minimal throughput of cells.

In a preferred embodiment said predetermined threshold value depends on the maximum time interval between two cells of said virtual circuit guaranteeing a minimal throughput of cells.

Said predetermined threshold value is advantageously stored in said context.

Other features and advantages of the invention will emerge from the following description of a preferred embodiment of the invention given by way of non-limiting illustrative example only and with reference to the appended drawings.

DETAILED DESCRIPTION OF THE INVENTION

The following description is based on that of a device for evaluating the throughput of virtual circuits using an asynchronous time-division multiplex transmission medium in French patent application FR-90 09 441 that will be summarized here sufficiently for the man skilled in the art to understand readily how the present invention may be put into effect. Of course, this relationship to the existing device is not mandatory and the present invention can be combined with other devices of the same kind.

Figure 1:
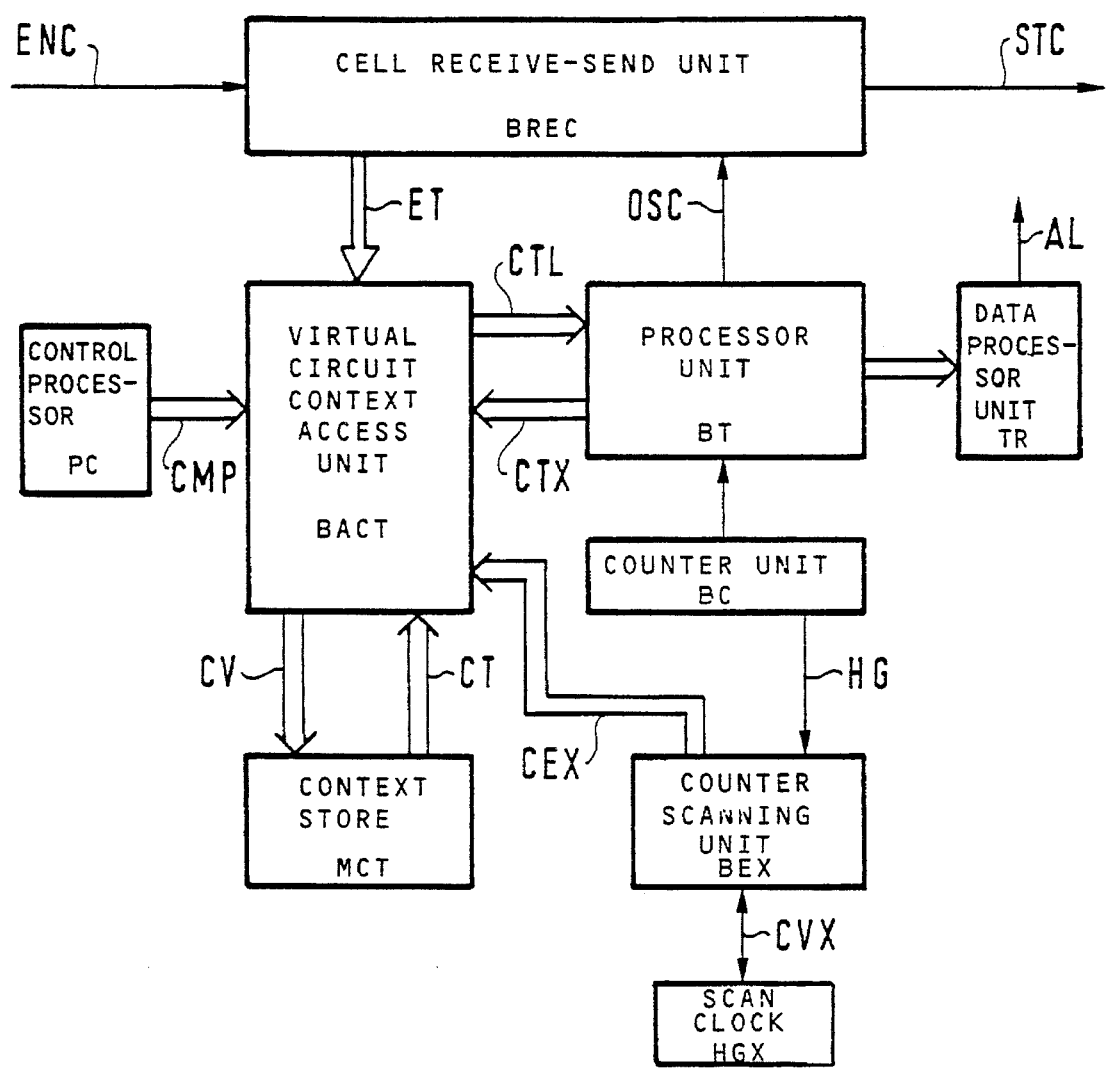
FIG. 1 is a block diagram on one embodiment of a device in accordance with the invention applied to a known communication device.

FIG. 1 is a block diagram of one embodiment of a device in accordance with the invention cooperating with the previously described prior art device.

A throughput evaluation system incorporating the present invention is inserted between a cell input ENC and a cell output STC. It is thereby inserted into an asynchronous time-division multiplex transmission medium of the type defined in the description of the prior art given in this application. To give an idea of the magnitudes involved, the binary throughput of the transmission medium at the input ENC is very high, in the order of 600 Mbit/s. This throughput passes through a cell receive-send unit BREC which may be regarded as a simple shift register. Provided that the throughputs of the virtual circuits supported by the link are acceptable, any cell received at the input ENC is purely and simply retransmitted to the output STC with a time-delay equal to the transmission time of one cell, for example (approximately 0.5 µs).

As soon as the header ET of a cell is available in the unit BREC it is supplied to a virtual circuit context access unit BACT in which the virtual circuit number CV is used as a read address of a context store MCT in order to read the context CT of the virtual circuit to which the cell received belongs. The context CT is a set of digital data of which some is semi-permanent (fixed for the duration of a call using the virtual circuit) and the remainder is modifiable (able to change as each cell of the virtual circuit is received). The context therefore contains data defining the "history" of the virtual circuit. The access unit BACT supplies the read CTL to a processor unit BT which also receives timing data supplied by a counter unit BC. Using the data from these two sources, the processor unit BT generates an updated context CTX which is returned to the access unit BACT and rewritten at the same address CV. It generates a signal OSC if the throughput evaluation in respect of the received cell indicates that corrective action is required, in the sense previously explained.

The updated context CTX contains modifiable data which may have been changed by the processing in the unit BT by virtue of the fact that a cell was received and, most importantly, by virtue of the time at which that cell was received, as indicated by the counter unit BC.

The signal OSC is transmitted to the unit BREC in which, in one embodiment, it substitutes an empty cell for the cell received. In a different embodiment, the signal OSC merely sets a flag provided in the header of the cell; this tells switching units that the cell subsequently passes through that it may not be forwarded in the event of an overload.

The time taken by the units BACT and BT to accomplish the operations just described is advantageously less than or equal to the transmission time of one cell, so that these blocks are then available for a new cycle of operation immediately the next cell is received.

The context data CT is initially written in the store MCT by a control processor PC communicating with the access unit BACT over a command link CMP. Each time, the command processor supplies a virtual circuit address CV and a context indication CT.

The unit BACT also includes devices for monitoring operation and the processor PC reads operation reports via the link CMP.

A cyclic scanning unit BEX receiving the numbers CVX of virtual circuits to be scanned from a scan clock HGX addresses the access unit BACT over the scan command link CEX for each CVX number, supplying the CVX number to the access unit BACT which addresses the context store MCT, modifies its content using the processor unit BT, and then rewrites the modified context CT. An operation of this kind may be accomplished once or several times, that is to say for one or several virtual circuit contexts, in time intervals reserved for this purpose within the transmission time for one cell. The scanning function is therefore interleaved with the normal evaluation processing in respect of cells passing through the evaluation device. The clock HGX is adapted to supply the numbers of all the virtual circuits in succession, whether the circuits are active or not.

The counter unit BC may be a simple binary counter advancing by one increment on each period of a built-in clock and so passing cyclically through all its positions. The scanning unit BEX receives clock pulses HG from the counter unit BC and commands accordingly the advance of the scan clock HGX and an operation of scanning a context to the access unit BACT.

The processor unit BT includes a scan circuit module which, as soon as a virtual circuit context CT is read by the unit BACT, receives from the access unit BACT the content of a storage area of the context CT used as a scan counter. If the context CT is read in the framework of the scanning function and commanded by the scanning unit BEX, the unit BACT also supplies an incrementing command signal. In return, the scan circuit module supplies the access unit BACT with a new value representing the old value increased by one unit, to be stored in said storage area for the context CT. As the scanning commanded by the unit BEX is cyclical and concerns all the contexts of all the virtual circuits, each scan counter advances by one increment for each scan cycle.

The scan counter of a context is reset after each cell to which the context relates is received.

To these arrangements the present invention adds a data processor unit TR which, in a first embodiment, receives:

the content SU of a storage area for the context stored in the context memory MCT, this context corresponding to the address pointed to by the scan clock HGX;

a fixed threshold value S stored in auxiliary storage means or in a storage area of the context;

the content LS of the scan counter of this context.

This data is supplied to the processor unit TR by the processor unit BT receiving the read context CTL, for example. Of course, if the invention is applied to other devices of this kind, the data may come from other sources; for example, it may be read directly from the context store MCT.

The data SU indicates the nature of the call constituted by the cells whose context is addressed by the scan clock HGX. According to the invention, the data SU indicates if this call guarantees a minimal throughput of cells or not. This data is loaded at the start of a call by the command processor PC using the command link CMP. In a preferred embodiment, the data SU comprises a single bit which is set to indicate that the cells corresponding to the pointed context belong to a call which guarantees a minimal throughput. The command processor PC receives at the start of a call, for example, immediately after a telephone subscriber lifts the handset, data from the telephone set indicating that the call guarantees a minimal throughput. The sender of the cells of the virtual circuit is thereby identified. The context bit SU is read using a mask or by successively shifting the context in the processor unit BT, for example.

The content LS of the scan counter corresponding to the context that is pointed to contains the number of scan cycles carried out by the scan clock HGX since the last cell of this context was received, because each time a cell of a given call is received the content of the respective scan counter is reset to its initial value (to zero, for example).

Figure 2:
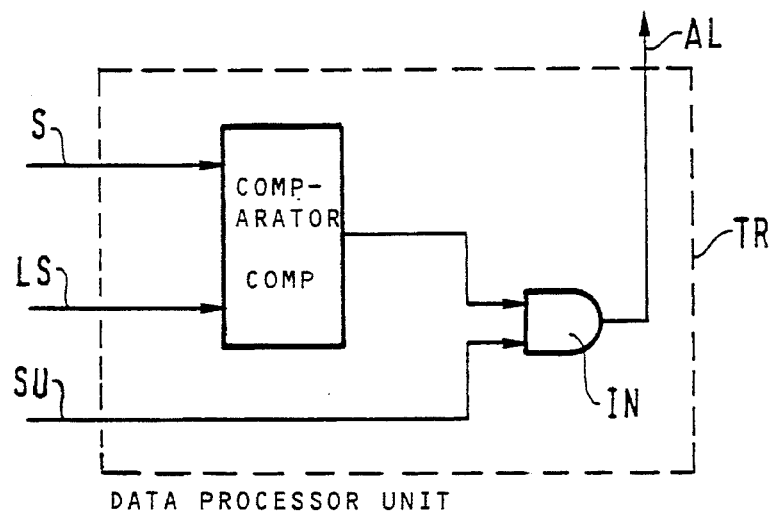
FIG. 2 shows one embodiment of processor means of this device in accordance with the invention.

The data processor unit TR advantageously comprises (see FIG. 2) a comparator COMP which compares the threshold value S with the content LS of the scan counter. If LS is greater than the threshold value S, the comparator COMP deduces that there is an abnormal absence of cells on the communication medium in question. However, this may be normal if the virtual circuit does not guarantee a minimal throughput, in other words there may be a long absence cells of this virtual circuit without this representing a fault. For this reason the data processor unit TR also includes means IN for inhibiting the logic value produced by the comparator COMP, for example in the form of an AND logic gate with one input connected to the output of the comparator COMP and another input connected to means providing the SU bit indicating the nature of the call. In this embodiment, if the SU bit is at one, the call is of the type guaranteeing a minimal throughput and if the SU bit is at zero the call is not monitored because a long absence of cells on the communication medium may be normal. If the comparator COMP indicates that the threshold value S has been exceeded by the content LS of the scan register and if the SU bit is set, the output of the processor unit TR supplies an alarm signal AL indicating that cells of a guaranteed minimal throughput call have not been received for a long time and therefore that the call has been cut off.

The alarm signal AL may be applied to the command processor PC, for example, which then produces the number of the virtual circuit for the call that has been cut off in order to enable the fault to be located. The call could equally be rerouted automatically using cell switches on the upstream side of the throughput measuring device.

Figure 3:
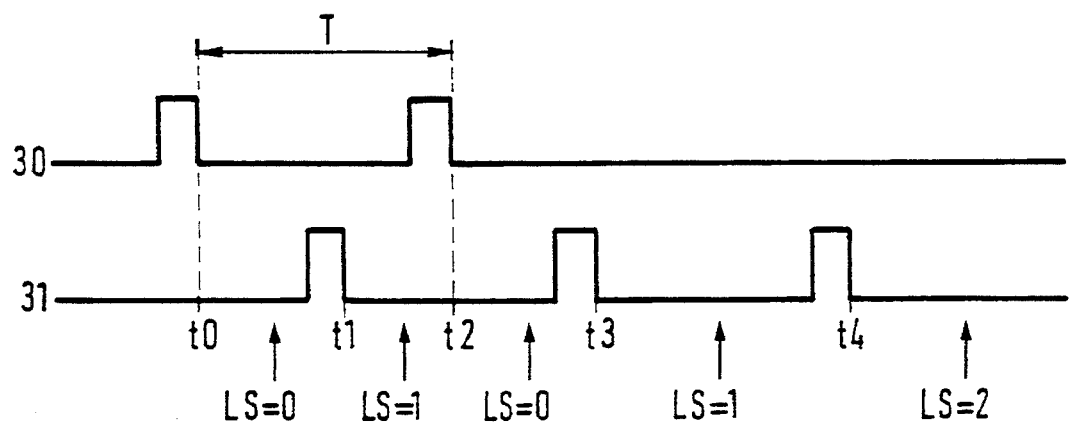
FIG. 3 is a timing diagram explaining the theory of the invention.

The threshold value S is chosen so that for a given call no alarm signal is generated if the minimal throughput is respected. The threshold value S is specific to each virtual circuit and is transmitted to the command processor PC at the same time as the data SU. The frequency at which the various contexts are scanned and therefore the frequency of the scan counters is advantageously such that each context is scanned in a time interval equivalent to the maximum gap between two cells. FIG. 3 shows this principle.

FIG. 3 is a timing diagram showing the arrival of cells of a virtual circuit guaranteeing a minimal throughput of cells and the virtual circuit context cyclic scanning periods.

The pulses of the series 30 each represent the reception of a cell of a given virtual circuit guaranteeing a minimal throughput. The context bit SU for this virtual circuit will therefore have been activated previously to enable a cut off call to be reported.

The pulses of the series 31 represent the cyclic scanning of the counter of this virtual circuit.

The arrival of a cell at time t0 resets the counter LS of the virtual circuit. At time t1 the cyclic scanning increments this counter by 1 and the counter LS then takes the value 1. At time t2 a new cell arrives and resets the counter and at time t3 LS is reset to 1 by the cyclic scanning. If during the time interval between t3 and t4 no further cell is received LS goes to 2 at time t4. By adjusting the cyclic scanning period so that the time interval between two successive scans is equivalent to the maximum gap T between two cells of a virtual circuit it is possible to set the value of the threshold S to 2, so that an abnormally long silence will be detected at time t4. It is equally possible to program the value of the threshold S according to the minimal throughput in question. The frequency of the scan clock HGX can then be constant irrespective of the call throughput.

If the present invention is implemented in a virtual circuit throughput evaluation device whose object is to limit the throughput of each virtual circuit to a respective maximum value, the transition of LS from 0 to 1 means that there is no need to check the next cell received of the virtual circuit in question. The incrementing of LS indicates that no cell has been received for a time period exceeding the minimal time interval between two cells so that the authorized maximal throughput has not been reached.

In a second embodiment of the invention the cyclic scan clock used in the above identified prior art to read the contexts in order to inhibit corrective action against received cells is complemented by a second cyclic scan clock whose frequency may be independent of the frequency of the first cyclic scan clock. The second clock uses the time periods in which the virtual circuit throughput measuring device is idle, in other words when no cell is received or processed. This clock commands scanning to monitor virtual circuits having a guaranteed minimal throughput.

In a first variant a table is provided containing the addresses of the contexts of the virtual circuits guaranteeing a minimal throughput. This table is updated at the start and at the end of each call set up on the asynchronous time-division multiplex transmission medium, by the command processor PC, for example. There is a corresponding relationship between each clock increment and an address in the table and each memory area of the table contains a separate virtual circuit address. Using the virtual circuit context address, a read device reads the context and supplies the value of the scan cycle counter and the threshold value for this virtual circuit to comparator means. As previously stated, this data can equally be stored in other storage means. If the value in the scan cycle counter is greater than the threshold value the alarm signal is generated.

This variant dispenses with the SU bit indicating if the virtual circuit guarantees a minimal throughput or not. However, it is then necessary to provide a table containing the addresses of the contexts of the virtual circuits guaranteeing a minimal throughput. Note that this variant amounts to establishing a threshold value equal to the ratio between the frequencies of the clock incrementing the scan counter and the clock controlling reading of the virtual circuit context address table. The advantage of this solution is that the scan cycle counter of each virtual circuit may comprise only one bit.

In a different variant a cyclic scan clock addresses in succession all the memory locations of a table containing all the SU bits of all the active virtual circuits, whether they belong to a call guaranteeing a minimal throughput or not. This table comprises words of 64 bits, for example, each bit representing the SU bit of one virtual circuit. This table is read to detect the active bits (the bits at 1, for example) and on the basis of the active bits in each word in the table to address the respective contexts of the virtual circuits to extract therefrom the contents of the scan counter and the threshold value, if these contexts also include threshold values.

This variant requires an independent scan clock and memory management means but has the advantage as compared with the first variant of requiring only one bit to be stored rather than a complete address.

The invention therefore makes it possible to detect abnormal cutting off of calls established using virtual circuits guaranteeing a minimal throughput. It can be used whenever a virtual circuit context cyclic scan clock is used in a virtual circuit throughput measuring device.

There is claimed;

1. Device for evaluating the throughput of virtual circuits conveying cells and using an asynchronous time-division multiplex transmission medium, comprising a store in which each virtual circuit is assigned a respective context in the form of a set of data relating to the throughput of said each virtual circuit, a clock adapted to supply a time signal whose value corresponds to a current time and a processor unit further comprising reading means for reading from said store, when each cell is received, the context of the respective virtual circuit, said context containing a start time equal to a previous value of said time signal that had been observed and stored when a previous cell of the virtual circuit in question was received, said context also containing an indication or the number of cells received subsequent to said start time and prior to the reception of the respective cell, subtracting means for subtracting said start time from a current value of said time signal to thereby obtain a time difference, cell number means responsive to reception of the respective cell and the context of the respective virtual circuit output by the reading means, for determining the number of cells received over said respective virtual circuit since said previous cell of the virtual circuit in question was received, current throughput means for determining a current throughput based on said time difference and said number of cells received, scanning means for cyclically scanning contexts of identified virtual circuits and, during said cyclic scanning, incrementing for each context the content of a scan cycle counter having an initial position, identification means associated with said store for identifying virtual circuits guaranteeing a minimal throughput and evaluating means comparing for each identified virtual circuit the content of said scan cycle counter for said identified virtual circuit with a predetermined three, hold value to produce a cut off call detection signal if the content of said counter reaches said predetermined threshold value.

2. Device according to claim 1 wherein said identification means is responsive to an identification signal and a respective value of said identification signal and the respective predetermined threshold value are both established by context programming means cooperating with set up reading means for reading call nature data conveyed on said transmission medium at the start of setting up of said call by a cell sender of a virtual circuit guaranteeing a minimal throughput of cells.

3. Device according to claim 1 wherein said predetermined threshold value depends on the maximum time interval between two cells of said each virtual circuit guaranteeing a minimal cell throughput.

4. Device according to claim 1 wherein said predetermined threshold value is stored in said context.

5. Device for detecting the absence of a predetermined minimal throughput of a virtual circuit conveying cells over an asynchronous time-division multiplex transmission medium, comprising:

a store in which the virtual circuit is assigned a context in the form of stored throughput data relating to said virtual circuit, said stored throughput data including an indication of when a previous cell of the virtual circuit in question was received;

timing means;

scanning and evaluating means responsive to said timing means for regularly accessing and processing said stored throughput data and producing a cut off call detection signal if said stored throughput data including said indication of when said previous cell of was received corresponds to a maximum possible average throughput rate since the receipt of said previous cell that is below a predetermined minimum throughput, and throughput calculation means for updating said stored throughput data in response to the receipt of a subsequent cell on said virtual circuit and storing said updated throughput data in said store.

6. Device according to claim 5 wherein: said indication of when a previous cell of the virtual circuit in question was received is a start time equal to a previous value of a time signal from said timing means that had been observed and stored when said previous cell of the virtual circuit in question was received;

said scanning and evaluating means regularly reads said start time and is responsive to a current value of said time signal; and said throughput calculation means updates said stored throughput data by writing said current value of said time signal into said start time.

7. Device according to claim 5 wherein:

said indication of when a previous cell of the virtual circuit in question was received is a scan cycle count having a predetermined initial value;

said scanning and evaluating means regularly increments said scan cycle count;

said scanning and evaluating means means compares said scan cycle count with a predetermined threshold value corresponding to said predetermined minimal throughput; and said throughput calculation means updates said throughput data by resetting said scan cycle count to said initial value.

8. Device according to claim 7 wherein said predetermined minimal throughput is based on a predetermined maximum time interval between two successive cells of said virtual circuit.

9. Device according to claim 8 wherein said predetermined threshold value is stored in said store.

10. Device according to claim 7 wherein:

said store includes context data for a plurality of virtual circuits;

said device further comprises identification means associated with said store for identifying which of said virtual circuits guarantee said predetermined minimal throughput;

said scanning and evaluating means processes the throughput data only for those virtual circuits identified by the identification means as guaranteeing said predetermined minimal throughput; and said identification means and said predetermined threshold value are responsive to call set up means for reading call nature data conveyed on said transmission medium at the start of setting up of said call by a cell sender of a virtual circuit guaranteeing said predetermined minimal throughput.

11. Device for evaluating the throughput of virtual circuits conveying cells and using an asynchronous time-division multiplex transmission medium, comprising a store in which each virtual circuit is assigned a respective context in the form of a set of data relating to the throughput of said each virtual circuit, each said context including a scan cycle count indicative of an elapsed time since a previous cell of the virtual circuit in question was received, a clock adapted to supply a periodic time signal, reading means for reading from said store, when each cell is received, the respective context of the respective virtual circuit, current throughput calculation means responsive to said reading means and to said clock, for updating the respective context including the respective scan cycle count to reflect a current throughput including an updated respective scan cycle count, scanning means responsive to said period time signal supplied by said clock for cyclically scanning contexts of at least some of the virtual circuits and, during said cyclic scanning, incrementing for each context said scan cycle count, identification means associated with said store for identifying at least one virtual circuit guaranteeing a minimal throughput and evaluating means comparing for each identified virtual circuit the respective scan cycle count for said identified virtual circuit with a respective predetermined threshold value to produce a respective cut off call detection signal if the respective scan cycle count reaches the respective predetermined threshold value.

12. Device according to claim 11 wherein said identification means is responsive to an identification signal and a respective value of said identification signal and the respective predetermined threshold value are both established by context programming means cooperating with set up reading means for reading call nature data conveyed on said transmission medium at the start of setting up of said call by a cell sender of a virtual circuit guaranteeing a minimal throughput of cells.

13. Device according to claim 11 wherein said predetermined threshold value depends on a maximum time interval between two cells of said identified virtual circuit guaranteeing a minimal cell throughput.

14. Device according to claim 11 wherein said predetermined threshold value is included in the context stored in the store.

* * * * *